US010767103B2

(12) United States Patent
Lortz et al.

(10) Patent No.: US 10,767,103 B2
(45) Date of Patent: Sep. 8, 2020

(54) METHOD OF OBTAINING MINERAL OIL USING A SILICA FLUID

(71) Applicant: Evonik Degussa GmbH, Essen (DE)

(72) Inventors: Wolfgang Lortz, Wächtersbach (DE); Ulrich Fischer, Mömbris (DE); Gabriele Bergmann, Grosskrotzenburg (DE); Ole Torsaeter, Heimdal (NO); Katherine Rose Aurand, Trondheim (NO)

(73) Assignee: Evonik Operations GmbH, Essen (DE)

( * ) Notice: Subject to any disclaimer, the term of this patent is extended or adjusted under 35 U.S.C. 154(b) by 69 days.

(21) Appl. No.: 15/770,786

(22) PCT Filed: Oct. 18, 2016

(86) PCT No.: PCT/EP2016/074923
§ 371 (c)(1),
(2) Date: Apr. 25, 2018

(87) PCT Pub. No.: WO2017/071985
PCT Pub. Date: May 4, 2017

(65) Prior Publication Data
US 2018/0312741 A1   Nov. 1, 2018

(30) Foreign Application Priority Data

Oct. 26, 2015   (EP) .................................... 15191457

(51) Int. Cl.
*C09K 8/584* (2006.01)
*E21B 43/16* (2006.01)
(52) U.S. Cl.
CPC .............. *C09K 8/584* (2013.01); *E21B 43/16* (2013.01); *C09K 2208/10* (2013.01)

(58) Field of Classification Search
None
See application file for complete search history.

(56) References Cited

U.S. PATENT DOCUMENTS 5,981,131 A    11/1999  Hirama et al.
6,036,808 A    3/2000   Shaw-Klein et al.
(Continued)

FOREIGN PATENT DOCUMENTS

WO     WO 02/22745        3/2002
WO     WO 2004/035474     4/2004
(Continued)

OTHER PUBLICATIONS

Hall, C.A., "Deposition of Aluminium Oxide Modified Core-shell Silica Particles onto Silica Surfaces," Thesis, University of Manchester, 2010, pp. 1-90; (2010).
(Continued)

*Primary Examiner* — John J Figueroa
(74) *Attorney, Agent, or Firm* — Law Office of: Michael A. Sanzo, LLC

(57) ABSTRACT

Method of obtaining mineral oil, comprising the steps of:
providing a fluid comprising surface-modified silica particles,
introducing this fluid into a mineral oil deposit via a first well in contact with this mineral oil deposit,
recycling a mixture comprising the fluid and mineral oil via the first well or a further well and separating the mineral oil from the mixture,
wherein the fluid comprises surface-modified nanostructured silica particles in an aqueous phase,
A) the surface modified silica particles
a) being mixed aluminium-silicon oxide, where the mixed oxide component is also part of the particle surface, and
(Continued)

b) the surface modification comprises a hydrocarbon radical which is interrupted by one or more heteroatoms and comprises a silicon atom is bonded to a carbon atom of the hydrocarbon radical, the surface modification being selected from the group consisting of $Si-(CH_2)_n-Y_m-R$, where Si is the Si atom which is bonded via a C atom to a hydrocarbon radical, and n=1, 2 or 3 and m=0 or 1

R is a radical which does not impart hydrophobic properties, and if m=1, is

—H, —$CH_3$, —$C_2H_5$, —OH, —$OCH_3$, —$OC_2H_5$, —C(═O)$OCH_3$, —C(═O)$OC_2H_5$, —O—C(═O)$CH_3$, —O—C(═O)$CH_3$, —O—C(═O)CH═$CH_2$, —O—C(═O)CH═CH($CH_3$), —C(═O)$CH_3$, —CH(O)$CH_2$ and hydrolysates of —CH(O)$CH_2$, and, if m=0, the aforementioned R radicals without —H, —$CH_3$, —$C_2H_5$, Y=—($OCH_2CH_2$)$_o$—, o=5-15 or a mixture of the aforementioned R and Y radicals.

c) having c1) a ratio of the proportions by weight of $Al_2O_3/SiO_2$ of 0.1:99.9-5:95 c2) an average particle diameter $d_{50}$ of 40-200 nm and c3) a carbon content of 3%-25% by weight and B) the fluid having d) a content of 0.01%-5% by weight of the surface modified silica particles, and e) a pH of the aqueous phase being 7≤pH≤8.5.

16 Claims, 1 Drawing Sheet

(56) References Cited

U.S. PATENT DOCUMENTS

| | | | |
|---|---|---|---|
| 8,017,098 B2 | 9/2011 | Uhrlandt et al. | |
| 8,885,341 B2 | 11/2014 | Desmarets | |
| 8,911,638 B2 | 12/2014 | Lortz | |
| 8,980,784 B2 | 3/2015 | Schultz Isfort et al. | |
| 10,144,858 B2* | 12/2018 | Kennedy | E21B 43/26 |
| 2002/0121156 A1 | 9/2002 | Menzel | |
| 2002/0168312 A1 | 11/2002 | Mangold et al. | |
| 2002/0172827 A1 | 11/2002 | O'Connor et al. | |
| 2003/0185739 A1 | 10/2003 | Mangold et al. | |
| 2003/0220204 A1 | 11/2003 | Baran et al. | |
| 2004/0037964 A1 | 2/2004 | Davies et al. | |
| 2004/0241101 A1 | 12/2004 | Baran et al. | |
| 2005/0133766 A1 | 6/2005 | Barthel et al. | |
| 2005/0282935 A1 | 12/2005 | Christian | |
| 2006/0093541 A1 | 5/2006 | Uhrlandt et al. | |
| 2006/0134606 A1 | 6/2006 | Montagu | |
| 2007/0110906 A1 | 5/2007 | Edelmann et al. | |
| 2009/0301345 A1 | 12/2009 | Mangold et al. | |
| 2010/0092765 A1 | 4/2010 | Hager et al. | |
| 2010/0107930 A1 | 5/2010 | Lortz et al. | |
| 2010/0181525 A1 | 7/2010 | Belmont | |
| 2010/0288963 A1 | 11/2010 | Minna et al. | |
| 2010/0301264 A1 | 12/2010 | Mangold et al. | |
| 2011/0028662 A1 | 2/2011 | Wiesner et al. | |
| 2011/0118382 A1* | 5/2011 | Reichenbach-Klinke | C04B 40/0039 523/130 |
| 2011/0245391 A1 | 10/2011 | Karpov | |
| 2013/0071649 A1 | 3/2013 | Hager et al. | |
| 2013/0303361 A1 | 11/2013 | Schultz Isfort et al. | |
| 2014/0292951 A1 | 10/2014 | Ferran et al. | |
| 2015/0075798 A1 | 3/2015 | Tang et al. | |
| 2015/0159074 A1* | 6/2015 | Luyster | C09K 8/03 166/305.1 |
| 2017/0151136 A1 | 6/2017 | Kim | |
| 2017/0166805 A1* | 6/2017 | Schultheiss | C09K 8/03 |
| 2018/0194947 A1 | 7/2018 | Lortz et al. | |
| 2019/0106328 A1 | 4/2019 | Lortz et al. | |
| 2019/0127587 A1 | 5/2019 | Lortz et al. | |

FOREIGN PATENT DOCUMENTS

| | | |
|---|---|---|
| WO | WO 2008/071462 | 6/2008 |
| WO | WO-2009/119178 A1 | 10/2009 |
| WO | WO 2010/042672 | 4/2010 |
| WO | WO 2014/020061 | 2/2014 |
| WO | WO 2017/071985 | 5/2017 |

OTHER PUBLICATIONS

Sigma-Aldrich; Ludox CL Colloidal Silica; https:www.sigmaaldrich.com/catalog/product/aldrich/420883?lang=en&region=US; accessed Jan. 8, 2019; 3 printed pages; (2019).

Sigma-Aldrich; Ludox CL Colloidal Silica; https:www.sigmaaldrich.com/catalog/product/aldrich/420891?lang=en&region=US; accessed Jan. 8, 2019; 3 printed pages; (2019).

Google Patents. English translation of WO 2009/119178 A1. https://patents.google.com/patent/WO2009119178A1/en accessed Oct. 4, 2018, originally published Oct. 1, 2009, 21 printed pages. (Year 2009).

Grace Davison Engineered Materials. "LUDOX® Colloidal Silca in Coatings Lithium Polysillicate in Coatings." Obtained from https://grace.com/coatings-and-inks/en-us/Documents/LUDOX%20Coatings%20TI.pdf on Oct. 4, 2018. pp. 1-6 (Year 2018).

Zhang, et al., "Synthesis of poly(ethylene glycol) (PEG)-grafted colloidal silica particles with improved stability in aqueous solvents," *Journal of Colloid and Interface Science* 310:446-455 (available on line Feb. 2007).

English translation of the International Search Report for PCT/EP2016/074923 filed Oct. 18, 2016.

English translation of the Written Opinion of the International Searching Authority for PCT/EP2016/074923 filed Oct. 18, 2016.

English translation of the International Preliminary Report on Patentability for PCT/EP2016/074923 filed Oct. 18, 2016.

English translation of the European Search Report and Opinion for EP 15 19 1457 filed Oct. 26, 2015.

English translation of the International Search Report for PCT/EP2016/064955 filed Jun. 28, 2016 for copending U.S. Appl. No. 15/743,242.

English translation of the Written Opinion of the International Searching Authority for PCT/EP2016/064955 filed Jun. 28, 2016 for copending U.S. Appl. No. 15/743,242.

English translation of the International Preliminary Report on Patentability for PCT/EP2016/064955 filed Jun. 28, 2016 for copending U.S. Appl. No. 15/743,242.

English translation of the International Search Report for PCT/EP2016/064994 filed Jun. 28, 2016 for copending U.S. Appl. No. 15/743,214.

English translation of the Written Opinion of the International Searching Authority for PCT/EP2016/064994 filed Jun. 28, 2016 for copending U.S. Appl. No. 15/743,214.

English translation of the International Preliminary Report on Patentability for PCT/EP2016/064994 filed Jun. 28, 2016 for copending U.S. Appl. No. 15/743,214.

English translation of the International Search Report for PCT/EP2016/064966 filed Jun. 28, 2016 for copending U.S. Appl. No. 15/743,177.

English translation of the Written Opinion of the International Searching Authority for PCT/EP2016/064966 filed Jun. 28, 2016 for copending U.S. Appl. No. 15/743,177.

English translation of the International Preliminary Report on Patentability for PCT/EP2016/064966 filed Jun. 28, 2016 for copending U.S. Appl. No. 15/743,177.

(56) References Cited

OTHER PUBLICATIONS

Aurand, et al., "Comparison of Oil Recovery for Six Nanofluids in Berea Sandstone Cores," International Symposium of the Society of Core Analysts, Avignon, France, Sep. 8, 2011.
Gonzalez-Matheus, et al., "Pickering-Stabilized Latexes with High Silica Incorporation and Improved Salt Stability," *Part. Part. Syst. Charact.* 31:94-100 (2014).
Hendraningrat, et al., "A Coreflood Investigation of Nanofluid Enhanced Oil Recovery in Low-Medium Permeability Berea Sandstone," *SPE* 164106:1-14 (Apr. 2013).
Ibrahim, et al., "Understanding the Mechanism of Nanoparticles Applications in Enhanced Oil Recovery," *SPE* 175806-MS:1-19 (Apr. 2015).
Metin. et al., "Stability of Aqueous Silica Nanoparticle Dispersions under Subsurface Conditions," *Clean Technology* www.ct-si.org, ISBN 978-1-4398-3419-0 pp. 25-28 (2010).
McElfresh, et al., "Stabilizing Nano Particle Dispersions in High Salinity, High Temperature Downhole Environments," *SPE* 154758:1-6 (Jan. 202).
Roustaei, et al., "An evaluation of modified silica nanoparticles' efficiency in enhancing oil recovery of light and intermediate oil reservoirs," *Egyptian Journal of Petroleum* 22:427-433 (Dec. 2013).
Vuorinen, et al., "Thermooxidative degradation of LDPE nanocomposites: Effect of surface treatments of fumed silica and boehmite alumina," *Polymer Degradation and Stability* 98(11)2297-2305 (Aug. 2013).
U.S. Appl. No. 15/743,242, filed Jan. 9, 2018, Lortz.
U.S. Appl. No. 15/743,214, filed Jan. 9, 2018, Lortz.
U.S. Appl. No. 15/743,177, filed Jan. 9, 2018, Lortz.
AEROSIL® R 816, Product Information; pp. 1-2; Oct. 2019.
Gelest Silane Coupling Agents: Connecting Across Boundaries; (2006); www.gelest.com.
Ludox® Technical Literature; E.I. du Pont de Nemours & Company, (1999).
Park, et al., "Effect of PEG molecular weight on stability, $T_2$ contrat, cytotoxicity, and cellular uptake of superparamagnetic iron oxide nanoparticles," *Colloids and Surfaces B: Biointerfaces*,119:106-114 (available online May 2014).
Restriction Requirement dated Jul. 23, 2018, for copending U.S. Appl. No. 15/743,242.
Response to Restriction Requirement filed Sep. 19, 2018, for copending U.S. Appl. No. 15/743,242.
Office Action dated Oct. 5, 2018, for copending U.S. Appl. No. 15/743,242.
Amendment and Response to Office Action filed Jan. 7, 2019, for copending U.S. Appl. No. 15/743,242.
Office Action dated Mar. 7, 2019, for copending U.S. Appl. No. 15/743,242.
Amendment and Response to Office Action filed Jun. 7, 2019, for copending U.S. Appl. No. 15/743,242.
Office Action for copending U.S. Appl. No. 15/743,242, dated Jul. 3, 2019.
Response to Office Action and RCE for copending U.S. Appl. No. 15/743,242, filed Oct. 8, 2019.
Office Action for copending U.S. Appl. No. 15/743,242, dated Dec. 5, 2019.
Restriction Requirement dated Apr. 8, 2019 for copending U.S. Appl. No. 15/743,214.
Response to Restriction Requirement filed Jun. 29, 2019, for copending U.S. Appl. No. 15/743,214.
Office Action dated Sep. 17, 2019, for copending U.S. Appl. No. 15/743,214.
Amendment and Response to filed Dec. 17, 2019, for copending U.S. Appl. No. 15/743,214.
Office Action dated Dec. 10, 2019, for copending U.S. Appl. No. 15/743,177.
Notice of Abandonment for copending U.S. Appl. No. 15/743,214, dated Mar. 17, 2020.
Amendment and Response for copending U.S. Appl. No. 15/743,177, filed Mar. 12, 2020.
Notice of Allowance for copending U.S. Appl. No. 15/743,177, dated Mar. 23, 2020.
Amendment and Response for copending U.S. Appl. No. 15/743,242, filed Mar. 12, 2020.
Non Final Office Action for copending U.S. Appl. No. 15/743,242, dated Mar. 26, 2020.
Response to Non Final Office Action filed May 6, 2020 for copending U.S. Appl. No. 15/743,242.
Miscellaneous Action with proposed Examiner amendments, dated Jun. 12, 2020, for copending U.S. Appl. No. 15/743,242.

* cited by examiner

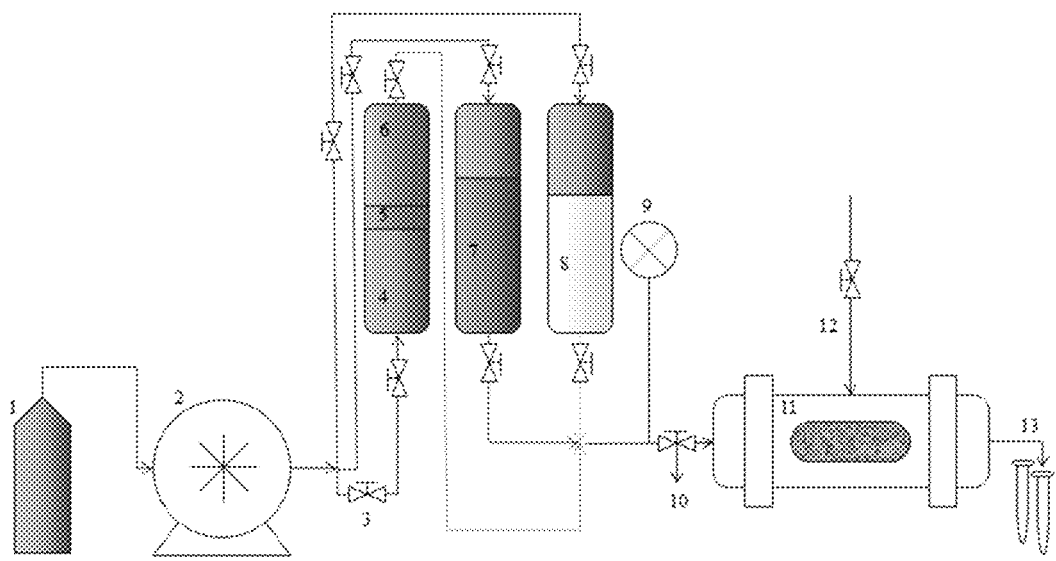

METHOD OF OBTAINING MINERAL OIL USING A SILICA FLUID

CROSS REFERENCE TO RELATED APPLICATIONS

The present application is US national stage of international application PCT/EP2016/074923, which had an international filing date of Oct. 18, 2016, and which was published in English under PCT Article 21(2) on May 4, 2017. Priority is claimed to European application EP 15191457.9, filed on Oct. 26, 2015.

FIELD OF THE INVENTION

The invention relates to a fluid and a method of obtaining mineral oil using this fluid. The fluid comprises surface-modified silica particles.

BACKGROUND OF THE INVENTION

Since the discovery of new mineral oil reservoirs is becoming increasingly difficult and the development thereof is becoming ever more expensive, ways of increasing the yield from reservoirs already in production are being sought. These include, for example, flooding with water and, in more recent times, flooding with formulations comprising nanoparticles. Especially formulations containing silicon dioxide are the focus of attention because of their environmental compatibility.

WO2014/020061 describes a method of producing mineral oil in which a shear-thickening formulation of polyethylene oxide, water and particular hydrophobic silica particles is used. This formulation exhibits thickening at moderate shear rates and thinning at high shear rates. This is said to enable simpler introduction of the formulation into the mineral oil deposit. However, the formulation described has limited stability in solutions having a high salt concentration, for instance seawater.

US2015075798 describes a method of producing mineral oil, in which a dispersion comprising hydrophobically modified polyacrylamide particles (HMPAM) and particles of a silica, for example a fumed silica, is used. The combination of particles is said to be more effective than a dispersion containing either only HMPAM or only silica.

Aurand et al., in International Symposium of the Society of Core Analysts, Avignon, France, Sep. 8-11, 2014 (SCA2014-017), report their results relating to EOR applications of nanostructured fumed silica particles and colloidal silica particles. According to these, the fumed particles show advantages. However, adsorption data and the rising pressure during the experiments point more to a mechanical effect of the fumed particles than to a chemical mechanism, such as the log-jamming of the particles on the rock.

Abbas Roustaei et al. report in Egyptian Journal of Petroleum (2013) 22, 427-433 report on the capability of silica particles to alter the wettability of the reservoir rock and reduce the interfacial tension between crude oil and brine phases. Fumed silica AEROSIL® R 816, Evonik Industries, was used, which is obtained by surface-modifying AEROSIL® 200, Evonik Industries, using hexadecylsilane. Fumed silica AEROSIL® R 816 is only partially hydrophilic. Fluids, 1-4 g/L of fumed silica AEROSIL® R 816 in ethanol were prepared by sonication.

US2003/220204 discloses a method of recovering oil comprising the step of injecting a foamable fluid, the fluid comprising surface-modified nanoparticles. The nanoparticles are selected from the group consisting of silica, titania, alumina, zirconia, vanadia, ceria, iron oxide, antimony oxide, tin oxide, alumina/silica, and combinations thereof. The nanoparticles can be surface-modified to obtain a nonpolar or a polar surface-modified nanoparticle. Suitable surface-modifying substrates are silanes selected from group consisting of alkylchlorosilanes, alkoxysilanes, trialkoxyarylsilanes, silane functional (meth)acrylates and polydialkylsiloxanes.

SUMMARY OF THE INVENTION

The problem addressed by the present invention was that of providing a fluid suitable for a process to exploit mineral oil, especially in offshore facilities. Suitable is understood to mean that the fluid is stable in seawater under elevated temperatures and does not cause an increase of pressure when in contact with the permeable formation comprising the mineral oil.

BRIEF DESCRIPTION OF THE DRAWINGS

The FIGURE included herewith illustrates a coreflooding apparatus set-up.

DECRIPTION OF THE INVENTION

The invention provides a method of obtaining mineral oil, comprising the steps of:
providing a fluid comprising surface-modified silica particles,
introducing this fluid into a mineral oil deposit via a first well in contact with this mineral oil deposit,
recycling a mixture comprising the fluid and mineral oil via the first well or a further well and separating the mineral oil from the mixture,
wherein the fluid comprises surface-modified nanostructured silica particles in an aqueous phase,
A) the surface modified silica particles
  a) being mixed aluminium-silicon oxide, where the mixed oxide component is also part of the particle surface, and
  b) the surface modification comprises a hydrocarbon radical which is interrupted by one or more heteroatoms and comprises a silicon atom is bonded to a carbon atom of the hydrocarbon radical, the surface modification being selected from the group consisting of Si—$(CH_2)_n$—$Y_m$—R, where Si is the Si atom which is bonded via a C atom to a hydrocarbon radical, and n=1, 2 or 3 and m=0 or 1
  R is a radical which does not impart hydrophobic properties, and
  if m=1, is
  —H, —$CH_3$, —$C_2H_5$, —OH, —$OCH_3$, —$OC_2H_5$, —C(=O)$OCH_3$, —C(=O)$OC_2H_5$, —O—C(=O)$CH_3$, —O—C(=O)$CH_3$, —O—C(=O)CH=$CH_2$, —O—C(=O)CH=CH($CH_3$), —C(=O)$CH_3$, —CH(O)$CH_2$ and hydrolysates of —CH(O)$CH_2$, and,
  if m=0, the aforementioned R radicals without —H, —$CH_3$, —$C_2H_5$,
  Y=—$(OCH_2CH_2)_o$—, o=5-15
  or a mixture of the aforementioned R and Y radicals,
  c) having
    c1) a ratio of the proportions by weight of $Al_2O_3/SiO_2$ of 0.1:99.9-5:95,
    c2) an average particle diameter $d_{50}$ of 40-200 nm, preferably 50-150 nm, c3) a carbon content of 3%-25% by weight, preferably 3%-15% by weight, and B) the fluid having d) a content of 0.01%-5% by weight, preferably 0.05%-0.5% by weight, of the surface modified silica particles, and e) a pH of the aqueous phase being 7≤pH≤8.5.

Mixed oxide is understood to mean an intimate mixture of the mixed oxide components at the atomic level. In mixed aluminium-silicon oxides, it is also possible for Si—O—Al bonds to be present.

"Nanostructured" is understood to mean that the particles are present in the fluid in the form of aggregated primary particles. While these primary particles generally have an average diameter of 5-15 nm, the average particle diameter in the fluid in this invention is 40-200 nm. These particles differ from silica sols, which are isolated individual particles having an average diameter of generally less than 50 nm. In the context of the present invention silica sols are not regarded as nanostructured. Within this invention the average particle diameter is synonymous to the average aggregate diameter.

The average particle diameter is an essential condition for the stability of the aqueous dispersion. The average particle diameter can be determined by the customary methods known to the skilled person of light scattering for the determination of particle size distributions in dispersions.

"Surface-modified" is understood to mean that the particles bear organic groups on their surfaces, keeping the originally hydrophilic properties to the particles. The degree of hydrophilicity may differ with the kind of surface modification and the percentage of surface modification. Hydrophilicity is a further essential condition for stability in an aqueous medium. "Stable" is intended to mean that essentially no reagglomeration and essentially no sedimentation within a defined period occurs The aqueous phase of the fluid may be a solution having a high or a low content of salts. A low content is understood to be an aqueous phase having a proportion of dissolved salts of not more than 0.5% by weight, better not more than 0.1% by weight. It is known that a low salt proportion may increase the yield of mineral oil in a flooding process. However there is yet no solution how to provide big amounts of these fluids in an offshore application. A high content is understood to be an aqueous phase comprising 2-5 wt.-% of dissolved inorganic salts, theses salts comprising at least chloride ions and sodium ions.

As a rule, the aqueous phase is seawater. The average salt content of sea water is 35 grams per kilogram seawater. This average value is true for most oceans and marginal seas, like the North Sea. The main components are ions of chloride, sodium, sulphate, magnesium, calcium, potassium, bicarbonate and strontium. The percentage of these ions is approx. 99.7% by weight of the total salt. As a rule the percentage of $Cl^-$ is 55, $SO_4^{2-}$ is 7.7, $Na^+$ is 30.7, $Mg^{2+}$ is 3.7, $Ca^{2+}$ is 1.2, $K^+$ is 1.1, $HCO_3^-$ is 0.4, and $Sr^{2+}$ is 0.02, numbers are approx. values and are given in % by weight.

High proportions of salt are possible only when the fluid is stable under the existing conditions. In the context of the invention it shall be the case that a fluid having 0.5% by weight surface-modified mixed aluminium-silicon oxide particles is stable for at least one month at a temperature of 60° C. in a test solution 1 that simulates seawater.

Test solution 1 is composed of: at 23° C. a mixture of 28.500 g of NaCl, 0.220 g of $NaHCO_3$, 4.066 g of $Na_2SO4$, 1.625 g of $CaCl_2 \times 2\ H_2O$, 3.162 g of $MgCl_2 \times 6\ H_2O$, 0.024 g of $SrCl_2 \times 6\ H_2O$ and 0.721 g of KCl is made up with fully demineralized water to give 1000 ml of solution. Alternatively, stability can be determined in a test solution 2 at 90° C. In this case, the aqueous dispersion is to be stable for at least 1 week. Test solution 2 consists of an NaCl solution, 3% by weight in water.

Good results with regard to salt stability are obtained with mixed aluminium-silicon oxide, preferably those where the $Al_2O_3/SiO_2$ weight ratio in the surface-modified metal oxide powder is 0.1:99.9-5:95, especially 0.2:99.8-3:97.

In this case, the $Al_2O_3/SiO_2$ weight ratio at the surface may be greater, smaller or equal to the weight ratio in the overall particle, characterized by "ttl". Preference is given to a ratio $(Al_2O_3/SiO_2)_{surface}/(Al_2O_3/SiO_2)_{ttl}$ of 0.1-10. The weight ratio at the surface can be determined, for example, by x-ray-induced photoelectron spectroscopy (XPS) on the powder. The weight ratio in the overall particle can be determined by chemical or physicochemical methods, for example x-ray fluorescence analysis.

Preferably the mixed aluminium-silicon oxide of the method according to the invention is a fumed mixed aluminium-silicon oxide having a BET surface area of 140-200 $m^2/g$ and an aluminium oxide content of 0.3%-1.3% by weight.

Particularly advantageously, it is possible to use fumed mixed aluminium-silicon oxide powders. Commercially available examples are AEROSIL MOX 80 having a BET surface area of 60-100 $m^2/g$ and aluminium oxide content of 0.3%-1.3% by weight and AEROSIL MOX 170 having a BET surface area of 140-200 $m^2/g$ and an aluminium oxide content of 0.3%-1.3% by weight. Particular preference is given to a fumed mixed aluminium-silicon oxide powder having a BET surface area of 140-200 $m^2/g$ and an aluminium oxide content of 0.3%-1.3% by weight.

In addition, it is possible to use the fumed mixed aluminium-silicon oxide powder disclosed in EP-A-995718. It is obtained by reacting a vaporous silicon dioxide precursor and an aluminium chloride solution in a flame. The fine distribution of aluminium chloride in the aerosol and during the genesis of the oxide in the gas phase results in substantially homogeneous incorporation of the aluminium.

It is likewise possible to use the fumed mixed aluminium-silicon oxide powder disclosed in EP-A-2500090, in which the weight ratio of $(Al_2O_3/SiO_2)_{ttl}$ in the overall particle is 0.002 to 0.05, and the weight ratio $(Al_2O_3/SiO_2)_{surface}$ of the particles in a layer close to the surface is lower than in the overall particle. The aluminium oxide concentration at the surface has thus been reduced further.

With preference it is possible for such particles to be obtained from pyrogenic processes. In these processes, silicon compounds and aluminum compounds are reacted in a flame generated by the reaction of hydrogen and oxygen. The resulting powders are referred to as "pyrogenic" or "fumed". Formed initially in the reaction are highly disperse primary particles, which in the further course of reaction come together to form aggregates. The aggregate dimensions of these powders are generally in the range of 0.2-1 μm. The particles have hydroxyl groups on their surface. Through suitable grinding, they can be converted to the nm range which is advantageous for the present invention, and can be subsequently treated with a surface-modifying agent.

The surface-modified mixed aluminium-silicon oxide may additionally form —Si—O—Al— bonds with the Si atom bonded via a C atom to a hydrocarbon radical, the Al atom being part of the particle surface.

The fluid comprises a surface modification of the particles in which an aluminium atom is bonded via an oxygen atom to a silicon atom on the particle surface. This aluminium modification relates both to the very substantially aluminium-free particles of mixed aluminium-silicon oxides.

The aluminium modification can preferably be effected by means of an alkali metal aluminate, an aluminium alkoxide such as aluminium isopropoxide or an aluminium acetylacetonate.

The proportion of Al in the surface modification is preferably 0.05-0.15 mg Al/m$^2$ of BET surface area.

The surface-modified particles present in the fluid have a surface modification in which a hydrocarbon radical is bonded via a C atom to an Si atom. This hydrocarbon radical is to be selected such that in the aqueous dispersion, the surface-modified mixed silicon aluminum has hydrophilic properties. This is dependent, for example, on the number of carbon atoms in the hydrocarbon radical and on the presence of functional hydrophilic groups, such as hydroxyl, ether, amine or carboxyl groups. The hydrocarbon radical may be interrupted by O or N.

Preferably the surface modification is selected from the group consisting of $Si(CH_2)_3$—$(OCH_2CH_2)_{6-9}$—$OCH_3$, $Si(CH_2)_3$—$(OCH_2CH_2)_{9-12}$—$OCH_3$, $Si(CH_2)_3$—$(OCH_2CH_2)_{21-24}$—$OCH_3$, $Si(CH_2)_3$—$(OCH_2CH_2)_{8-12}OH$ and $Si$—$(CH_2)_3$—$CH(O)CH_2$, $CH(O)CH_2$ being epoxy.

Besides water, the liquid phase of the fluid may also include small fractions of alcohol, such as methanol, ethanol, propanol or butanol. The proportion of alcohol is generally less than 1% by weight.

The fluid may include small amounts, less than 100 ppm, of customary dispersants. In the context of the present invention, however, the presence of dispersants is not advantageous. The stabilizing effect of the fluid derives solely from the surface-modified, hydrophilic aluminum-silicon mixed oxide. Preservatives may be added in usual amounts.

The production of the fluids occurs by diluting an aqueous dispersion. In the context of this invention, an aqueous dispersion is defined as a dispersion having a percentage of surface-modified mixed aluminium-silicon oxide particles of more than 5% by weight, preferably more than 10% by weight and most preferably 10%-40% by weight. The dispersion also having a percentage of dissolved salts of less than 2%, preferably less than 1.5% by weight.

The mixed aluminium-silicon oxide powders are dispersed in an aqueous solvent and subsequently an agent for surface modification is added, in which an Si atom is bonded via a C atom to a hydrocarbon radical and the Si atom is additionally bonded to one or more hydroxyl groups, alkoxy groups, halide groups or mixtures thereof. The mixture is caused to react, preferably by adjusting the pH to 10-12, and afterwards the pH is optionally adjusted to 8-9. The hydrolysis product is optionally removed.

It is also possible to vary the agent for surface modification in which an Si atom is bonded via a C atom to a hydrocarbon radical in such a way that it is first reacted with at least one metal compound selected from the group consisting of the metal alkoxides and metal acetylacetonates of aluminium, titanium and zirconium, and also sodium aluminate. The molar metal/Si ratio of the surface modification is preferably 1:2-1:20.

The agent for surface modification is in each case added in such an amount as to obtain a carbon content of 3%-25% by weight, taking account of the hydroxyl groups, alkoxy groups or halide groups detached in the hydrolysis. When compounds having alkoxy groups are used, an alcohol, for example methanol or ethanol, is the hydrolysis product.

A good number of methods are available to the skilled person for the dispersing. In order to produce finely divided dispersions, for example, apparatus such as ultrasound probes, ball mills, agitator-mechanism ball mills, rotor/stator machines, planetary kneaders/mixers or high-energy mills, or combinations, are available. Accordingly, for example, a preliminary dispersion can be prepared using a rotor/stator system, and in a subsequent step, this preliminary dispersion is ground further by means of a high-energy mill. Through this combination, it is possible, for example, to produce extremely fine dispersions having a particle diameter. In the case of a high-energy mill, a preliminary dispersion under a high pressure is divided into two or more streams, which are then released through a nozzle and impinge exactly on one another.

It has been found to be advantageous to proceed directly from an aqueous dispersion of a powder.

In general, the mixture is caused to react in each case by setting a pH of 11 or more, thermally treating the mixture at a temperature of 50-95° C. over a period of 1-30 minutes, and subsequently, optionally, setting a pH of 8-10.

Another object of the invention is a method of obtaining mineral oil, comprising the steps of:
a) providing a dispersion comprising more than 5 wt.-% of surface-modified silica particles by
  a1) dispersing a mixed aluminium-silicon oxide powder having a ratio of the proportions by weight of $Al_2O_3$/$SiO_2$ of 0.1:99.9-5:95 and Si atoms and Al atoms each bearing hydroxyl groups on the surface of the particles in an aqueous solution to an average particle diameter d50 of 40-200 nm and subsequently
  a2) adding the agent for surface modification, and
  a3) causing the mixture to react to obtain the dispersion comprising of surface-modified silica and
  a4) optionally removing the hydrolysis product and
  a5) optionally adjusting the pH;
    wherein the agent for surface modification is added in such an amount as to obtain a carbon content of 3-25% by weight, taking account of the hydroxyl groups, alkoxy groups or chloride groups detached in the hydrolysis, and
    wherein the agent for surface modification is selected from the group consisting of
    $X_{4-a}[Si$—$(CH_2)_n$—$Y$—$R]_a$ with a=1, 2 or 3; preferably a=1; n=1, 2 or 3;
    X=OH, $OCH_3$, $OC_2H_5$, Cl; Y=—$(OCH_2$—$CH_2)_o$—, o=5-15,
    R=—H, —$CH_3$, —$C_2H_5$, —OH, —$OCH_3$, —$OC_2H_5$, —$C(=O)OCH_3$, —$C(=O)OC_2H_5$, —O—$C(=O)CH_3$, —O—$C(=O)CH_3$, —$CH(O)CH_2$ or a hydrolysate of —$CH(O)CH_2$
b) diluting the dispersion to obtain a fluid having
    a content of 0.01%-5% by weight of the surface modified mixed aluminium-silicon oxide particles, and
    a pH of the aqueous phase of 7≤pH≤8.5 or is adjusted to this range
c) introducing this fluid into a mineral oil deposit via a first well in contact with this mineral oil deposit,
d) recycling a mixture comprising the fluid and mineral oil via the first well or a further well and
e) separating the mineral oil from the mixture.

The hydrolysate of —$CH(O)CH_2$ may be formed from 3-glycidyloxypropyltrimethoxysilane (GLYMO). The hydrolysate is obtainable by, as described in EP-A-0832911, Example 1, hydrolysing GLYMO in an aqueous acid.

In a special embodiment the silane is mixed with at least one metal compound selected from the group consisting of the metal alkoxides and metal acetylacetonates of aluminium, titanium and zirconium, and also sodium aluminate wherein the molar metal/Si ratio of the surface modification is 1:2-1:20 before it is added to the predispersion.

The method of the invention is generally conducted by introducing the fluid into a mineral oil deposit having a temperature of 10-200° C., preferably 20-150° C., more preferably 40-100° C.

EXAMPLES

Starting Materials
Mixed Aluminium-Silicon Oxide Powder
  A: AEROSIL® MOX 170: The powder has the following properties:
  99% by weight of silicon dioxide, 1% by weight of aluminium oxide. The BET surface area is 173 m²/g. $(Al_2O_3/SiO_2)_{ttl}/(Al_2O_3/SiO_2)_{surface}=0.9$.
  B: According to EP-A-995718, Example 1. The powder has the following properties:
  99.7% by weight of $SiO_2$, 0.27% by weight $Al_2O_3$ content. The aluminium oxide content is distributed homogeneously. The BET surface area is 55 m²/g.
Dispersions—not Surface-Modified
Dispersion of Mixed Aluminium-Silicon Oxide A (AEROSIL® MOX 170)
  A 100 l stainless steel batching vessel was charged with 37 kg of water. Subsequently, under shear conditions (Ystral Conti-TDS 3 (stator slots: 4 mm ring and 1 nm ring, rotor/stator separation about 1 mm), 10 kg of AEROSIL® MOX 170 were first sucked in. The remaining 5 kg were sucked in stepwise in amounts of about 1 kg each time. After the end of the addition, shearing was continued at 3000 rpm for 30 min. In order to grind fractions of coarse particles still remaining, this preliminary dispersion was passed through the Sugino Ultimaizer HJP-25050 high-energy mill at a pressure of 2500 bar with diamond nozzles of diameter 0.25 mm in two runs and subjected to further intensive grinding in this way. The concentration of AEROSIL® MOX 170 is 20% by weight. The average particle diameter $d_{50}$ is determined by static light scattering (LA-950, Horiba Ltd., Japan) to be 112 nm.
Dispersion of Mixed Aluminium-Silicon Oxide B
  In accordance with Example 1, a 20 percent dispersion of mixed silicon-aluminium oxide B is produced. The average particle diameter $d_{50}$ is determined by static light scattering (LA-950, Horiba Ltd., Japan) to be 82 nm.
  Fumed silica dispersion 1; 20 wt.-%; NaOH stabilized; BET surface area 200 m²/g; $D_{50}$ aggregate size 81 nm
  Fumed silica dispersion 2; 20 wt.-%; NaOH stabilized; BET surface area 300 m²/g; $D_{50}$ aggregate size 86 nm
  Fumed silica dispersion 3; 20 wt.-%; NaOH stabilized; BET surface area 200 m²/g; $D_{50}$ aggregate size 106 nm
  $D_{50}$ aggregate size being measured using a Horiba LA 910 light scattering apparatus.
  Water: this is fully demineralized water; Aqueous sodium hydroxide solution: 25% by weight NaOH; Hydrochloric acid: 20% by weight HCl
Dispersions—Surface-Modified
Agents for Surface Modification
  OM1: 2-[Methoxy(polyethyleneoxy)$_{6-9}$propyl]trimethoxysilane
  OM2: Hydrolysate of 3-glycidyloxypropyltrimethoxysilane as per Example 1, EP-A-832911
  OM3: DYNASYLAN® GLYMO, 3-Glycidyloxypropyltrimethoxysilane, Evonik Industries
  OM4: Aluminium isopropoxide Production of Mixtures from OM1 and OM4
  Mixture 1: Al/Si ratio=1:6.5
  20 g of OM4 are added to 150 g of OM1 and the mixture is heated to 70° C. while stirring. After cooling, insoluble components are removed by centrifuging. An XRF of the calcination residue shows 11.5% by weight of $Al_2O_3$ and 88.5% by weight of $SiO_2$.
  A molar Al/Si ratio of 1:6.5 is calculated therefrom.
  Mixture 2: Al/Si ratio=1:13. Further proportions of OM1 are added to mixture 1.
  Surface-modified Dispersion 4 (D4): 10.25 g of mixture 1 are added gradually to 40 g of the dispersion of mixed silicon-aluminium oxide A while stirring. To start with there is a rise in viscosity, which drops off again, however, on further addition. Then aqueous sodium hydroxide solution is used to set a pH of 11, with stirring, and the mixture is heated to 90° C. After 10 minutes at 90° C., it is left to cool to room temperature and a pH of 9 is set using hydrochloric acid.
  Surface-modified Dispersion 5 (D5): 10.25 g of mixture 2 are added gradually to 40 g of the dispersion of mixed silicon-aluminium oxide A while stirring. To start with there is a rise in viscosity, which drops off again, however, on further addition. Then aqueous sodium hydroxide solution is used to set a pH of 11, with stirring, and the mixture is heated to 90° C. After 10 minutes at 90° C., it is left to cool to room temperature and a pH of 9 is set using hydrochloric acid.
  Surface-modified Dispersion 6 (D6): Mixed silicon-aluminium oxide A and OM1
  9.63 g of OM1 are added gradually to 40 g of the dispersion of mixed silicon-aluminium oxide A while stirring. To start with there is a rise in viscosity, which drops off again, however, on further addition. Then aqueous sodium hydroxide solution is used to set a pH of 11, with stirring, and the mixture is heated to 90° C. After 10 minutes at 90° C., it is left to cool to room temperature and a pH of 9 is set using hydrochloric acid.
  Surface-Modified Dispersion 7 (D7): Mixed Silicon-Aluminium Oxide B and OM2
  6.82 g of OM2 are added gradually to 40 g of the dispersion of mixed silicon-aluminium oxide B while stirring. The mixture now has a pH of 2.84. Subsequently, the pH is set to pH 11 with sodium hydroxide solution and heated to 90° C. for 10 min. After cooling, the pH is adjusted to 9 with hydrochloric acid.
Fluids
  The fumed silica dispersions D1-D3 and the surface modified dispersion D6 are then diluted to 2 wt.-% with deionized water and then further diluted to 0.05 wt.-% with a synthetic brine solution to obtain the corresponding fluids F1-F3 and. The synthetic brine solution (NSW) is a mixture of deionized water, sodium chloride, sodium hydrogen carbonate, sodium sulfate, calcium chloride, magnesium chloride, strontium chloride and potassium chloride. This results in a salinity of 3.53%. The pH values of the fluids are between 7.00 and 7.85
Coreflooding Experiments
  Experiments were conducted using a degassed crude oil from a North Sea reservoir. All liquid density measurements were determined by computing the average of three pycnometer measurements. All liquid viscosity measurements were determined by computing the average of two capillary-type viscometer measurements. These values can be found in Table 2. The decane had a density of 0.73 g/cm³ and a viscosity of 0.91 cP at ambient conditions (20° C.). A degassed crude oil from the North Sea was filtered to 5 μm and used as a comparison against the experiments with decane. It had a density of 0.84 g/cm³ and a viscosity of 3.59 cP at 20° C. (Table 2). A SARA analysis on a crude oil sample taken from the same reservoir gave a composition of 61.2 wt.-% saturates, 32.4 wt.-% aromatics, 4.9 wt.-% resins and 1.5 wt.-% asphaltenes.

Prior to drainage, all core plugs were saturated with a synthetic reservoir brine composed of 3.0 wt.-% sodium chloride (NaCl) and distilled water. Synthetic North Sea water (NSW) was used as the fluid for both the waterflooding and water flushing stages of the coreflooding experiments.

Porous Media

Berea sandstone core plugs with average length of 13 cm and diameter of 3.8 cm were used for this study. The cores for the comparative experiments (cores 1-1 to 1-3) were drilled from a different sandstone block than the core for the experiment according to the invention. Porosity was determined using the saturation method, and the average porosity for the cores was 17.1%. Absolute permeability was determined by flooding the reservoir brine (3 wt.-% NaCl) through the cores at different injection rates. The average permeability for the cores was 338 mD. Specific values for each of the cores are presented in Table 2.

The core plugs were cleaned using methanol via a soxhlet extraction apparatus at 65° C. for 24 hours. After rinsing, they were placed in an oven set at 60° C. for over 48 hours and weighed each day until the weight was stable and therefore no more liquid was present in the core. The core plugs were then saturated with reservoir brine using a vacuum pump (P≈0.1 bar) for 2 hours. The cores remained in the reservoir brine bath until they were tested for absolute permeability and used in the coreflooding experiments. Pore volume and porosity were calculated using the dry and saturated weights of each of the cores. The cores were not aged in oil at any time during the experimental process.

X-ray diffraction (XRD) analyses were performed for seven samples taken from the same sandstone block as the core plugs used in the study. The XRD analysis showed that the sandstone is primarily quartz with microcline and diopside as secondary components (Table 3).

Experimental Set-Up

The coreflooding apparatus set-up is shown in the FIGURE included herewith. The system uses plastic piping with a diameter of 0.125 inches. The sleeve pressure in the Hassler type core holder was kept at 20 bars throughout the duration of the experiments. All experiments, unless otherwise noted, were performed at ambient conditions.
1) Exxol D60 pump fluid, 2) pump, 3) valves, 4) Exxol D60 displacing reservoir fluid, 5) piston to separate the oils, 6) crude oil, 7) NSW, 8) particle fluid, 9) pressure gauge, 10) bypass valve, 11) Hassler cell holder with core, 12) sleeve pressure, 13) effluent into test tubes.

Experimental Procedure

The unsteady-state coreflooding tests had slightly different injection rates and durations for the stages. The temperature of the examples is 20° C.

Comparative Examples

1. The drainage process was conducted by injecting oil at 0.4 mL/min until it appeared that no more brine would be produced (typically after two pore volumes of total injection). This procedure established the initial water saturation.
2. Water flooding was then conducted with the synthetic NSW brine to simulate imbibition conditions in the North Sea. The brine was injected at 0.4 mL/min until it appeared that no more oil would be produced by this method (typically after two pore volumes of total injection). This procedure determined the residual oil saturation.
3. Tertiary particle flooding was then conducted at an injection rate of 0.4 mL/min until it appeared that no more oil would be produced by this method (typically after two pore volumes of total injection).
4. The oil recovery performance (expressed as the percent of the original oil in place) was evaluated for each core flooding experiment.

Example According to the Invention

1. The drainage process was conducted by injecting the oil phase at 0.3 mL/min for two pore volumes (PV). The injection rate was then increased to 3 mL/min and oil was injected until no more reservoir brine would be produced. This second injection step lasted for 5 to 10 PV. The initial water saturation was determined at the end of the drainage process. The core holder was then sealed and the lines flushed in preparation for the waterflooding stage.
2. The first part of the imbibition process was conducted by flooding NSW through the core for 5 PV with an injection rate of 0.3 mL/min. Then the injection rate was increased to 3 mL/min to increase the differential pressure and to be certain that any oil produced during the particle flooding stage was a result of an interaction between the fluid and the oil phase (and perhaps the sandstone) and not just from a pressure increase or time increase. The 3 mL/min waterflooding stage was performed for 2 to 5 PV. Recovery factors and oil saturations were calculated at the end of both waterflooding stages.
3. Particle flooding was performed by injecting the fluid into the core at 0.3 mL/min for at least 10 PV. After the initial particle flooding stage, the injection rate was increased to 3 mL/min for 2 PV to see if any oil would dislodge from the system. Recovery factors and oil saturations were calculated at the end of both particle flooding stages.
4. NSW was injected into the core again after particle flooding as a "water flushing" step. The injection rate was 0.3 mL/min for the first 2 PV and then 3 mL/min for 2 PV.

Comparative Examples

The oil displacement results for the fumed silica dispersions D1-D3 are shown in Table 4. The differential pressure across the core plug increased throughout the particle flooding process (Table 5). When the fluids were inspected after their respective coreflooding test, aggregation was clearly visible. When the core plugs were removed from the Hassler core holder cell, visible aggregation had occurred on the inlet surface. The concentration of the fumed silica particles in the particle flooding effluent was tested at the beginning, middle, and end of the second pore volume of flooding injection, taken after one pore volume of fluid had already been injected through the core. Silica produced from the core plug itself was also measured from the waterflooding stage and subtracted from the concentration in the particle flooding stage. The results show that essentially no particles are exiting the core; all are retained in the core plug. As the particle flooding stage progresses, the particles begin to exit the core, but still over 90% of the fumed silica particles are retained.

In light of the aforementioned analyses, the oil produced from the particle flooding is primarily from microscopic diversion of fluid flow due to mechanical log-jamming of the particles in the pore throats.

Example According to the Invention

The oil displacement results for fluid F6 is shown in Table 6, and a summary of the recovery factor as a percent of original oil in place (OOIP) can be found in Table 7.

Fluid F6 resulted in an increase in oil recovery during the low injection rate stage. This oil was typically produced after a few pore volumes had already been flooded through the core, insinuating that it takes time for the particles to interact with the system before they are able to produce more oil. Differential pressure slightly increased throughout the low injection rate particle flooding stage, but it did so at such a small rate that significant pore blockage was not taking place as observed in the comparative experiments. Prolific aggregation of the particles has not been detected in sample mixtures of crude oil and fluids. In the crude oil experiments, flooding effluent was produced as an oil in water emulsion, but it quickly separated and two distinct phases were visible after 3 hours. The in-situ creation of an unstable emulsion could be the primary EOR mechanism for this system.

The NSW water flushing stage after the particle flooding always had a lower differential pressure than during the particle flooding stage. This insinuates that the water flushing is effective at cleansing the system of particles.

Similar coreflooding experiments were performed at a temperature of 60° C. using a different Berea sandstone. The fluids F1-F3 generated a drastical increase of the pressure. These fluids can not be used for an EOR process.

The fluids F6 and F7 resulted in an increase in oil recovery, whereas the differential pressure only slightly increased. But it did so at such a small rate that significant pore blockage was not taking place as observed in the comparative experiments.

TABLE 1

Dispersion comprising surface-modified particles

| Dispersion | Average particle diameter $d_{50}$ [nm] | Stability[#] |
|---|---|---|
| D4 | 123 | 3 weeks |
| D5 | 122 | 2 weeks |
| D6 | 121 | 12 months |
| D7 | 93 | 1 month |

[#]test solution 1, 60° C.;

TABLE 2

Core plug properties.

| Core | Pore volume (mL) | Porosity (%) | Permeability (mD) |
|---|---|---|---|
| F1-F3 | | | |
| 1-1 | 23.2 | 18.1 | 394 |
| 1-2 | 25.4 | 18.2 | 358 |
| 1-3 | 26.1 | 18.4 | 438 |
| F6 | | | |
| 2-5 | 19.4 | 16.9 | 320 |

TABLE 3

XRD analysis

| Sample | 1 | 2 | 3 | 4 | Average |
|---|---|---|---|---|---|
| Berea sandstone block for cores for Fluids 1-3 | | | | | |
| Quartz | 94.59 | 93.1 | 92.99 | — | 93.6 |
| Microcline | 3.94 | 5.67 | 5.65 | — | 5.1 |
| Diopside | 1.47 | 1.23 | 1.36 | — | 1.4 |
| Berea sandstone block for cores for Fluid 6 | | | | | |
| Quartz | 92.73 | 92.74 | 93.84 | 92.25 | 92.9 |
| Microcline | 5.98 | 6.08 | 5.05 | 6.43 | 5.9 |
| Diopside | 1.3 | 1.18 | 1.11 | 1.32 | 1.2 |

TABLE 4

Comaparative Examples - Summary of coreflooding data

| Fluid | Core | $S_{wi}$ | $S_{or}$ | % OOIP - water flooding | % OOIP particle flooding |
|---|---|---|---|---|---|
| F1 | 1-1 | 0.28 | 0.36 | 50.00 | 8.56 |
| F2 | 1-2 | 0.28 | 0.29 | 59.02 | 5.74 |
| F3 | 1-3 | 0.27 | 0.30 | 58.82 | 11.76 |

TABLE 5

Differential pressure (mbar/PV) increase throughout the particle flooding stage averaged by pore volume (PV) injected.

| Fluid | Core | Differential pressure increase throughout particle flooding |
|---|---|---|
| F1 | 1-1 | 28.8 |
| F2 | 1-2 | 26.4 |
| F3 | 1-3 | 41.1 |
| F6 | 2-5 | 3.6 |

TABLE 6

Examples according to the invention - Fluid saturations from the coreflooding experiments

| Fluid | Core | PV (mL) | OOIP (mL) | $S_{wi}$ | Water flooding $S_{or}$ | Particle flooding $S_{or}$ |
|---|---|---|---|---|---|---|
| F6 | 2-5 | 19.37 | 10.4 | 0.46 | 0.51[a]  0.46[b] | 0.45[a]  0.45[b] |

TABLE 7

Examples according to the invention - Recovery factor values from the coreflooding experiments.

| | | | | Recovery Factor (RF) as % OOIP | | |
|---|---|---|---|---|---|---|
| Fluid | Core | PV (mL) | OOIP (mL) | Waterflooding | Particle flooding | Final RF |
| F6 | 2-5 | 19.37 | 10.4 | 4.31[a]/9.67[b]/ 13.98[c] | 1.44[a]/1.45[b]/ 2.89[c] | 16.87 |

[a]$Q_{inj}$ = 0.3 mL/min;
[b]$Q_{inj}$ = 3 mL/min;
[c]= Total

The invention claimed is:

1. A method of obtaining mineral oil, comprising the steps of:
   a) providing a fluid comprising surface-modified silica particles;
   b) introducing this fluid into a mineral oil deposit via a first well in contact with this mineral oil deposit;
   c) recycling a mixture comprising the fluid and mineral oil via the first well or a further well; and
   d) separating the mineral oil from the mixture;
   wherein the fluid comprises surface-modified nanostructured silica particles in an aqueous phase,
   A) the surface modified silica particles:
      a) being mixed aluminium-silicon oxide, wherein the mixed oxide component is also part of the particle surface, and
      b) the surface modification comprises a hydrocarbon radical which is interrupted by one or more heteroatoms and comprises a silicon atom bonded to a carbon atom of the hydrocarbon radical, the surface modification being selected from the group consisting of $Si-(CH_2)_n-Y_m-R$, where Si is the Si atom which is bonded via a C atom to a hydrocarbon radical, and
      n=1, 2 or 3 and m=0 or 1
      R is a radical which does not impart hydrophobic properties, and
      if m=1, is: $-H$, $-CH_3$, $-C_2H_5$, $-OH$, $-OCH_3$, $-OC_2H_5$, $-C(=O)OCH_3$, $-C(=O)OC_2H_5$, $-O-C(=O)CH_3$, $-O-C(=O)CH_3$, $-O-C(=O)CH=CH_2$, $-O-C(=O)CH=CH(CH_3)$, $-C(=O)CH_3$, $-CH(O)CH_2$ and hydrolysates of $-CH(O)CH2$; and,
      if m=0, the aforementioned R radicals without $-H$, $-CH_3$, $-C_2H_5$;
      $Y=-(OCH_2CH_2)_o-$, o=5-15;
      or a mixture of the aforementioned R and Y radicals;
   c) having:
      c1) a ratio of the proportions by weight of $Al_2O_3/SiO_2$ of 0.1:99.9-5:95;
      c2) an average particle diameter $d_{50}$ of 40-200 nm; and
      c3) a carbon content of 3%-25% by weight; and
   B) the fluid having:
      d) a content of 0.01%-5% by weight of the surface modified silica particles; and
      e) a pH of the aqueous phase being 7≤pH≤8.5.

2. The method of claim 1, wherein the surface modification comprises an aluminium atom which is bonded via an oxygen atom to a silicon atom of the particle surface.

3. The method of claim 1, wherein the mixed silicon-aluminium oxide is a fumed mixed silicon-aluminium oxide having a BET surface area of 140-200 m²/g and an aluminium oxide content of 0.3%-1.3% by weight.

4. The method of claim 1, wherein $(Al_2O_3/SiO_2)_{surface}/(Al_2O_3/SiO_2)_{ttl}$ is 0.1-10.

5. The method of claim 1, wherein the surface modification further comprises Al.

6. The method of claim 5, wherein the proportion of Al in the surface modification is ≤0.15 mg Al/m² of BET surface area.

7. The method of claim 1, wherein the surface modification is selected from the group consisting of: $Si(CH_2)_3-(OCH_2CH_2)_{6-9}-OCH_3$, $Si(CH_2)_3-(OCH_2CH_2)_{9-12}-OCH_3$, $Si(CH_2)_3-(OCH_2CH_2)_{21-24}-OCH_3$, $Si(CH_2)_3-(OCH_2CH_2)_{8-12}OH$ and $Si-(CH_2)_3-CH(O)CH_2$.

8. The method of claim 2, wherein the mixed silicon-aluminium oxide is a fumed mixed silicon-aluminium oxide having a BET surface area of 140-200 m²/g and an aluminium oxide content of 0.3%-1.3% by weight.

9. The method of claim 8, wherein $(Al_2O_3/SiO_2)_{surface}/(Al_2O_3/SiO_2)_{ttl}$ is 0.1-10.

10. The method of claim 9, wherein the surface modification further comprises Al.

11. The method of claim 10, wherein $(Al_2O_3/SiO_2)_{surface}/(Al_2O_3/SiO_2)_{ttl}$ is 0.1-10.

12. The method of claim 1, wherein the surface modification further comprises Al.

13. The method of claim 3, wherein the silane is mixed with at least one metal compound selected from the group consisting of the metal alkoxides and metal acetylacetonates of aluminium, titanium and zirconium, and also sodium aluminate wherein the molar metal/Si ratio of the surface modification is 1:2-1:20 before it is added to the predispersion.

14. The method of claim 1, wherein the fluid is introduced into a mineral oil deposit having a temperature of 10-200° C.

15. A method of obtaining mineral oil, comprising the steps of:
   a) providing a dispersion comprising more than 5 wt.-% of surface-modified silica particles by:
      a1) dispersing a mixed aluminium-silicon oxide powder having a ratio of the proportions by weight of $Al_2O_3/SiO_2$ of 0.1:99.9-5:95 and Si atoms and Al atoms each bearing hydroxyl groups on the surface of the particles in an aqueous solution to an average particle diameter $d_{50}$ 40-200 nm and subsequently;
      a2) adding the agent for surface modification;
      a3) causing the mixture to react to obtain the dispersion comprising of surface-modified silica;
      a4) optionally removing the hydrolysis product; and
      a5) optionally adjusting the pH;
      wherein the agent for surface modification is added in such an amount as to obtain a carbon content of 3-25% by weight, taking account of the hydroxyl groups, alkoxy groups or chloride groups detached in the hydrolysis, and
      wherein the agent for surface modification is a silane selected from the group consisting of:
      $X_{4-a}[Si-(CH_2)_n-Y-R]_a$ with a=1, 2 or 3; preferably a=1; n=1, 2 or 3;
      $X=OH$, $OCH_3$, $OC_2H_5$, $Cl$; $Y=-(OCH_2-CH_2)_o-$, o=5-15,
      $R=-H$, $-CH_3$, $-C_2H_5$, $-OH$, $-OCH_3$, $-OC_2H_5$, $-C(=O)OCH_3$, $-C(=O)OC_2H_5$, $-O-C(=O)CH_3$, $-O-C(=O)CH_3$, $-CH(O)CH_2$ or a hydrolysate of $-CH(O)CH_2$;
   b) diluting the dispersion to obtain a fluid having a content of 0.01%-5% by weight of the surface modified mixed aluminium-silicon oxide particles, and having a pH of the aqueous phase of 7≤pH≤8.5 or adjusting the pH to this range;
   c) introducing this fluid into a mineral oil deposit via a first well in contact with this mineral oil deposit;
   d) recycling a mixture comprising the fluid and mineral oil via the first well or a further well; and
   e) separating the mineral oil from the mixture.

16. The method of claim 15, wherein the fluid is introduced into a mineral oil deposit having a temperature of 10-200° C.

* * * * *